Nov. 26, 1957  G. BLATCHFORD  2,814,127
LEVEL INDICATING DEVICE
Filed May 7, 1954  2 Sheets-Sheet 1
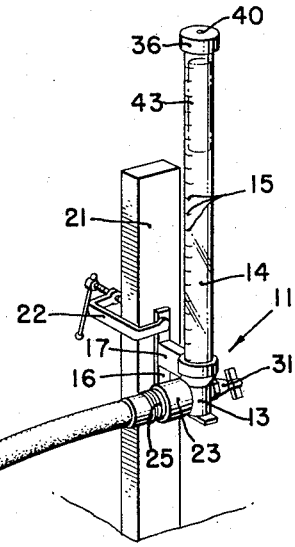
FIG. 1.
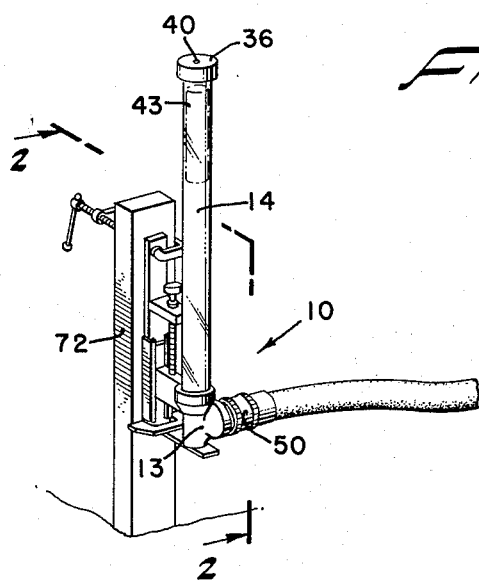
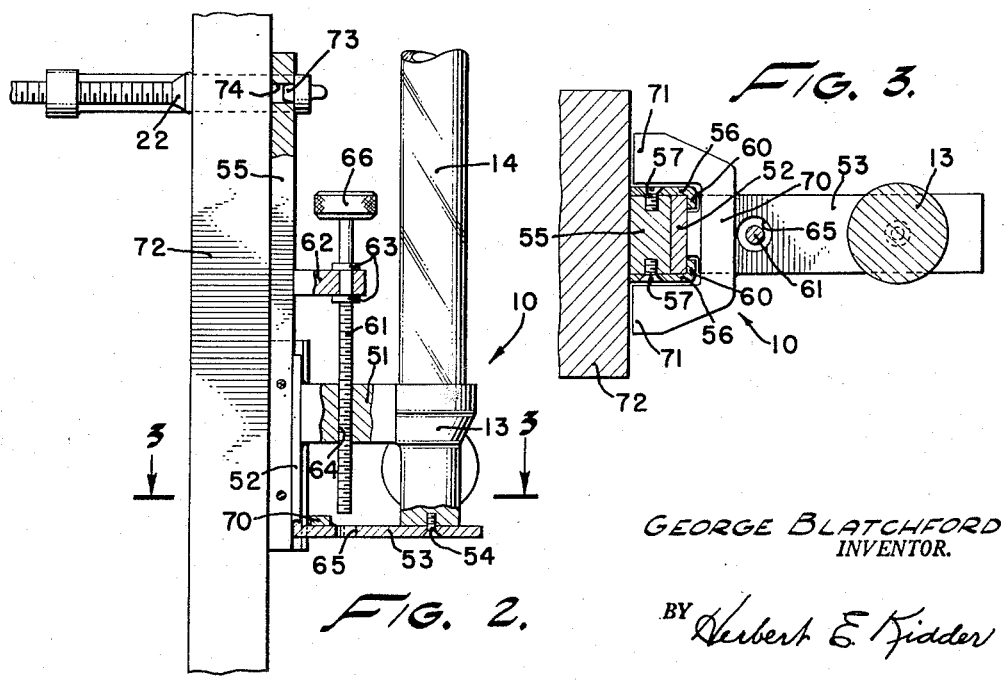
FIG. 3.
FIG. 2.
GEORGE BLATCHFORD
INVENTOR.
BY Herbert E. Kidder
ATTORNEY Nov. 26, 1957 G. BLATCHFORD 2,814,127
LEVEL INDICATING DEVICE
Filed May 7, 1954 2 Sheets-Sheet 2

GEORGE BLATCHFORD
    INVENTOR.

BY Herbert E. Kidder

ATTORNEY

United States Patent Office 2,814,127
Patented Nov. 26, 1957

---

2,814,127

LEVEL INDICATING DEVICE

George Blatchford, Riverside, Calif.

Application May 7, 1954, Serial No. 428,184

1 Claim. (Cl. 33—209)

The present invention relates to devices for determining the level of one point with respect to another, and more particularly, to devices of this kind which are especially adapted for construction work, where the two points may be remote from one another and not in a direct line of sight.

The primary object of the invention is to provide a level indicating device that is simple in construction, inexpensive, easy to operate, and extremely accurate. One important feature of the invention is that it comprises two units that are attached to opposite ends of a length of common garden hose, of the type found in practically every household. Thus, the operating range of the instrument can be extended to almost any desired distance by merely coupling together a series of twenty-five or fifty foot sections of hose.

Another object of the invention is to provide a level indicating device of such simple operation that an inexperienced operator can determine the level of a given point with respect to a remote reference point in a matter of minutes, whereas the same operation performed with a transit would require a considerably longer time and would necessitate a skilled operator.

A further object of the invention is to provide a device of the class described having a micrometer adjustment on one of the two end units, whereby the said unit can be clamped to a grade stake or other support at the approximate level, and then quickly adjusted to the exact level with a high degree of accuracy.

Another object is to provide means for quickly and easily filling the system with water and for purging air therefrom, while a related object is to provide novel and improved means for sealing the system against loss of fluid, which is particularly desirable where the system is filled with anti-freeze.

Still a further object of the invention is to provide means for damping surges of fluid from one end of the system to the other due to sudden change in level of one unit with respect to the other, and for quickly bringing the fluid level to rest.

The foregoing objects are achieved by providing two generally similar units which are adapted to be coupled to the ends of a length of garden hose. Each of the said units has a transparent vertical tube of glass or plastic mounted thereon which communicates with the hose and is graduated to provide a visual indication of the fluid level. The tubes are closed at their top ends by caps which are pierced by small orifices that permit air to escape as the tube fills with water. A float in each of said tubes carries a needle valve which seats in the said orifices to close the same when the tube is full of water, and thereby prevents further loss of water.

A drain pet cock is provided in one of the units to permit water and air bubbles to escape while the system is being filled.

The graduated tube of one unit is attached to its mounting bracket by means of a micrometer adjusting screw that permits extremely accurate vertical adjustment of the tube to obtain an exact level condition. By virtue of this arrangement, the mounting bracket need only be clamped to a grade stake or other support at the approximate level position; the final adjustment being made by the adjusting screw.

Other objects and advantages of the present invention will become apparent to those skilled in the art upon consideration of the following detailed description of the preferred embodiment thereof, reference being had to the accompanying drawings, wherein:

Figure 1 is a perspective view of a level indicating device embodying the principle of the invention, and showing the manner in which it is used;

Figure 2 is an enlarged, partially cut away, fragmentary view, taken at 2—2 in Figure 1;

Figure 3 is a further enlarged sectional view, taken at 3—3 in Figure 2;

Figure 4:
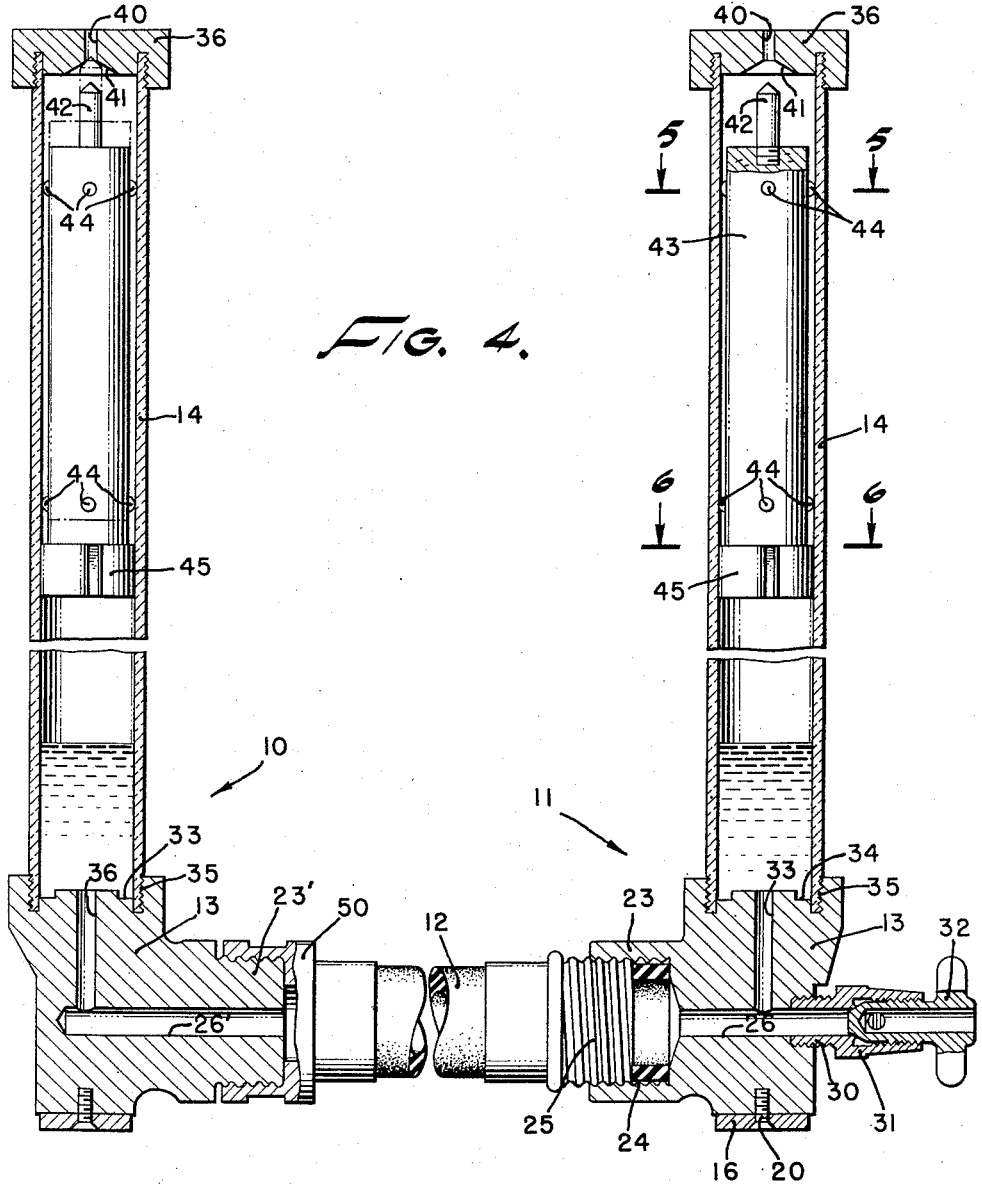
Figure 4 is a vertical section thru both of the end units.

In the drawings, the two end units are designated in their entirety by the reference numerals 10 and 11, and are connected together by a length of ordinary garden hose 12. The two end units 10, 11 are generally similar in construction, and differ only in certain details. Each comprises a pedestal base 13 of brass or other corrosion resistant material, and mounted on the top end of the base is a transparent vertical tube 14 of glass or plastic, having vertically spaced graduations 15 marked thereon, as seen in Figure 1.

The base 13 of unit 11 is attached to the vertical arm of an L-shaped bracket 16 by a lug 17, and the horizontal foot of the bracket abuts against the bottom of the base and is secured thereto by a screw 20. The bracket 16 is adapted to be clamped to a grade stake 21 or other support by means of a C-clamp 22, which provides a simple, quickly operated means of securing the unit to the reference point from which the level is being taken.

Projecting laterally from one side of the base 13 is a boss 23, which is bored out and threaded at 24 to receive the male coupling 25 of the hose. A smaller diameter bore 26 extends horizontally from the axial center of the boss 23 to the opposite side of the base, where it is counterbored and tapped to receive the threaded stud 30 of a drain petcock 31. The drain pet cock 31 shown in the drawings is of the conventional type, having a thumbscrew 32 which is threaded into the pet cock body, and which is backed out to open the drain.

Intersecting the bore 26 intermediate its ends is an upwardly extending bore 33, which opens into a circular cavity 34 in the top end of the body 13, into which the bottom end of the tube 14 is inserted. The cavity 34 may be tapped to receive threads 35 on the bottom end of the tube, or the tube may be inserted into a smooth-sided cavity and cemented in place.

Figure 5:
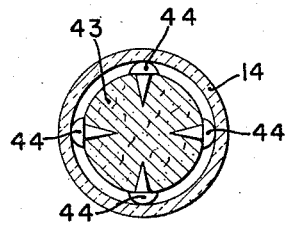
Figure 5 is a transverse section thru one of the end unit tubes at 5—5 in Figure 4.
Figure 6:
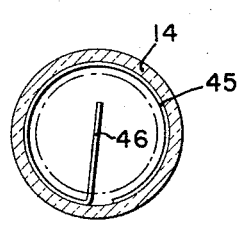
Figure 6 is a section taken at 6—6 in Figure 4.

Mounted on the top end of the tube 14 is a cap 36, having a small orifice 40 provided in the center thereof. The bottom end of the orifice is chamfered at 41 to form a seat for a needle valve 42 which is screwed into the top end of a cylindrical float 43 that is disposed within the tube. The float 43 may be of cork or other buoyant material, and has centering pins 44 inserted into its sides near the top and bottom ends, as best shown in Figure 5, which hold the float away from the sides of the tube and center the needle valve 42, so that it is aligned with the orifice 40. When the float 43 is not floating in water, it rests upon a spring clip stop 45, which expands against and grips the sides of the tube 14. The spring clip 45 is shown in plan view in Figure 6, and is seen to be a circular strip of spring bronze or other non-corroding material, with a tang 46 extending inwardly across a diameter of the circle. The bottom end of the float rests upon this tang 46.

The other unit 10 is similiar to the unit 11, except that the boss 23' is externally threaded to receive the female coupling 50 of the hose, and the bore 26' stops short of the side of the base 13, and has no drain pet cock. Other parts that are identical to those described in unit 11 are given the same reference numerals.

Referring now to Figures 2 and 3, the base 13 is connected by a horizontally projecting lug 51 to the vertical leg 52 of an L-shaped bracket member, while the horizontal leg 53 of the bracket abuts against the bottom of the base 13 and is secured thereto by a screw 54. The vertical leg 52 of the bracket lies flat against the side of a vertical bar 55, and is confined thereto by two angle members 56 which are secured by screws 57 to opposite sides of the bar 55 at the lower end thereof. Flanges 60 of the angle members 56 extend inwardly toward one another, and are spaced from the outer face of the bar 55 sufficient distance to provide a sliding fit for the vertical leg 52.

The base 13 and tube 14 of unit 10 are adjustable vertically with respect to the bar 55 by means of a micrometer adjusting screw 61, which is rotatably supported on a flange 62 projecting laterally from the bar 55 above the top ends of the angle member 56. Washers 63 on opposite sides of the flange 62 constrain the screw 61 against endwise movement while permitting free rotation. The screw 61 extends down thru a tapped hole 64 in the lug 51, and when the screw is turned, the base member 13 is moved up or down. A hole 65 is provided in the horizontal leg 53, thru which the bottom end of the screw 61 passes when the vase 13 is raised far enough. A knurled head 66 on the top end of the screw provides means whereby the screw can be turned.

A generally U-shaped plate 70 is attached to the top side of the horizontal leg 53, and the arms of the U extend back along opposite sides of the bar 55 and brackets 56 to provide wings 71 adjacent the surface of the grade stake 72, or other support. These wings 71 serve as marking guides for making pencil marks on the grade stake when the unit is exactly level. The bar 55 is secured to the grade stake 72 by means of a C-clamp 22, the stationary jaw of which is provided with a small, projecting, tapered stud 73. The stud 73 seats within a hole 74 in the top end of the bar, which aids in preventing the stationary jaw of the C-clamp from slipping off the bar 55 while attaching the unit to a grade stake.

The operation of my level indicating device is as follows: Unit 11 is first attached to the male coupling 25 of the hose, and the pet cock 31 is opened. The female coupling 50 of the hose is then attached to a faucet, which is turned on to fill the hose with water. The water is allowed to run until bubbles cease to flow from the pet cock, at which point the pet cock is closed and the water is turned off. The female coupling 50 is then removed from the faucet and attached to unit 10. Unit 11 is attached to a grade stake 21, with the bottom edge of the horizontal leg of the angle bracket 16 carefully set at a pencil mark of known level. This is the reference level, and the second unit 10 will be placed on a remote grade stake 72 to find the point thereon at exactly the same level as the pencil mark on the reference stake 21. The unit 10 is carried to the remote grade stake 72, and is clamped thereto at approximately the correct level. The approximate level is found by merely raising and lowering the unit 10 until the water is at approximately the same level in both tubes. Unit 10 is then clamped to the grade stake, and the adjusting screw 61 is turned one way or the other to bring the unit 10 to the position exactly level with unit 11, wherein the fluid level is at the same level in both tubes. At this point, a pencil mark is made on the grade stake, using the underneath side of the wings 71 as a guide.

The orifice 40 serves as a vent, permitting air to flow into or out of the tube 14 as the water level changes. The orifice also acts as a damper, to damp out surges of the water from one end of the hose to the other due to rapid changes in elevation of one of the end units 10, 11. The floats 43 with their attached needle valves 42 close the orifice 40 in the lower unit when the other unit is raised, thereby preventing loss of water in the system. The principal feature of the invention, however, is the micrometer screw adjustment of unit 10, which permits quick clamping of the unit to the grade stake at approximate level, then accurate adjustment of the unit to bring the same to exact level.

While I have shown and described the preferred embodiment of my invention in considerable detail, it will be understood that such details are merely illustrative of the principles involved, and that various changes may be made without departing from the scope of the appended claim.

I claim:

A level indicating device comprising a pair of liquid filled graduated transparent sight tubes connected together by a flexible hose, each of said sight tubes being supported at its bottom end on a base member, and each of said base members having a hose fitting adapted to make connection with one end of said flexible hose, one of said base members being fitted to a vertical bar having clamping means engageable with a grade stake to secure the same at a given level, the other of said base members being attached to a vertically movable bracket slidably disposed between a pair of laterally spaced guide flanges, said guide flanges being secured to opposite sides of a second vertical bar, clamping means for securing said second vertical bar to a second grade stake at a distance from said first grade stake, a flange projecting from said second vertical bar in alignment with its associated base member, an adjusting screw rotatably supported in said flange and having threaded engagement with said associated base member, whereby the latter and its sight tube can be adjusted vertically with micrometric accuracy, each of said sight tubes having a float disposed therewithin, and valve means projecting upwardly from said floats and engageable with valve seats in the top ends of said sight tubes to close air vents when the tubes are filled with liquid.

References Cited in the file of this patent

UNITED STATES PATENTS

| | | |
|---|---|---|
| 397,294 | Karr | Feb. 5, 1889 |
| 717,716 | Robbins | Jan. 6, 1903 |
| 1,576,470 | Richardson | Mar. 9, 1926 |
| 2,150,048 | Boyd | Mar. 7, 1939 |
| 2,438,758 | Leach | Mar. 30, 1948 |
| 2,546,825 | Kravetz | Mar. 27, 1951 |
| 2,566,102 | Waldo | Aug. 28, 1951 |
| 2,587,998 | Heath | Mar. 4, 1952 |

FOREIGN PATENTS

| | | |
|---|---|---|
| 15,594 | Great Britain | June 29, 1910 |
| 2,483 | Australia | June 9, 1932 |